United States Patent

Thorsoe et al.

[15] 3,646,365
[45] Feb. 29, 1972

[54] STEP SWITCH

[72] Inventors: Flemming Thorsoe, Augustenborg; Arne Jensen, Havnbjerg, both of Denmark

[73] Assignee: Danfoss A/S, Nordborg, Denmark

[22] Filed: Apr. 17, 1970

[21] Appl. No.: 29,556

[30] Foreign Application Priority Data

Apr. 26, 1969  Germany ...................... P 19 21 424.5

[52] U.S. Cl. .......................... 307/252 B, 307/215, 307/218, 307/223, 307/252 Q, 328/43
[51] Int. Cl. .................................................... H03k 17/00
[58] Field of Search ............... 307/222, 252.21, 223; 328/37, 328/43, 44

[56] References Cited

UNITED STATES PATENTS

| | | | |
|---|---|---|---|
| 3,534,403 | 10/1970 | Matarese | 307/222 |
| 3,177,359 | 4/1965 | Bramer | 307/222 B |
| 3,192,478 | 6/1965 | Metz | 307/222 |

Primary Examiner—Donald D. Forrer
Assistant Examiner—David M. Carter
Attorney—Wayne B. Easton

[57] ABSTRACT

The invention relates to a step switch assembly which switches power on and off in a stepwise manner in dependence upon the upper and lower limiting values of a control signal. The switch assembly may be used for operating in a stepwise manner a bank of units such as motors wherein each motor, or group of motors, represents a portion or part of the total available capacity of a system such as air conditioning system. The step switch assembly includes a reversible counter, a transmitter for sending digital impulses to the counter, and power stages which are switchable on and off in dependence upon information stored at the counter output points.

4 Claims, 3 Drawing Figures

STEP SWITCH

The invention relates to a step switch, which switches power on and off in a stepwise manner, in dependence upon the upper and lower limiting values of a control signal.

A step switch of this kind can be used, for example, in a refrigerating installation and, in dependence upon the load, represented by the evaporator pressure, the evaporator temperature, the temperature of the cold compartment or the like, can switch the refrigerating power on or off, the capacity of a single compressor, or where several compressors are present, the number of the units in operation being varied in a stepwise manner. In the case of an air-conditioning plant, the quantity of water that has to be fed in can be varied in a stepwise manner in dependence upon humidity. The number of boilers in operation in a heating installation can be altered in dependence upon temperature. The same applies in the case of other installations.

It is known to drive a control motor in one rotary direction in dependence upon the upper limiting value and in the other rotary direction in dependence upon the lower limiting value and, with the help of cammed discs fitted on the shaft of the motor, to actuate switch contacts, which switch power-supply units on and off, directly or indirectly. When the upper limiting value is reached, the motor runs until the first unit and, possible, further units are switch on and in any case until the control signal no longer indicates the top limiting value. A further cammed disc, secured to the shaft of the motor, and its associated contacts ensure that the motor is stopped when the upper or lower limit of capacity of the installation is reached.

With such an arrangement it is difficult to shape the various cammed discs and to fit them on the motor shaft in such a manner that the various partial capacities are each switched on or off at the correct moment. If the motor is at a standstill while a contact is located precisely at the point where the associated cam merges with the noncammed part, nonpositive conditions arise. Also, the use of a motor incorporating cammed discs and the associated switches is expensive, calls for a considerable amount of space and is trouble prone.

The object of the invention is to provide a step switch which can perform its function with a minimum of contacts and other moving parts, and always occupies precisely defined operating positions. In particular, it should also be possible to manufacture the switch at low cost and in a manner such that it saves space.

According to the invention, this object is achieved by it being possible to send digital impulses, during the period at which the control signal is at its limiting value, to a reversible counter which counts up or down in dependence upon the nature of the limiting value, and by the power stages being switched on or off in dependence upon the information stored at the counter output points.

Thus, as long as the control signal is at one of the two limiting values, impulses that continue to actuate the counter are sent, so that partial capacities can be brought in or cut out depending upon the number of impulses and upon the nature of the limiting value. Since the counter moves one step farther only upon receipt of an impulse, the information available at the output point is precisely defined in each operating position. The use of such a counter also enables any required number of stages to be used. Since both the impulse transmitter and the counter as well as the circuit that evaluates the information can be of purely electronic design, it is possible largely to dispense with moving contacts or other moving parts.

The lead carrying the digital impulses to the counter expediently contains a blocking element which, at the end-positions of the counter, interrupts further passage of impulses beyond these positions. With the help of a blocking element of this kind, use can be made of a reversible counter of normal design which would operate cyclically without the danger arising of the installation being switched back to zero capacity when the upper limit is still maintained at full capacity, or conversely, of the installation not being switched to full capacity when the lower limit is still maintained upon zero capacity being reached.

In one embodiment of the invention, there are provided two impulse transmitters, one of which is switched in when the upper limiting value is reached and which is connected to the count-up input on the counter, the other impulse transmitter being switched in when the lower limit is reached and being connected to the countdown input point of the counter. This ensures in a simple manner that the counter counts up at the upper limiting value and counts down at the lower limiting value.

Another embodiment is characterized by an impulse transmitter which is switched in when each of the two limiting values is reached and is connected to the input point of the counter, and by a first control lead which switches the counter to the count-up condition when the upper limiting value is reached, and by a second control lead which switches the counter to the countdown condition when the lower limiting value is attained. This results in a particularly inexpensive construction.

Furthermore, the impulse transmitter can comprise a condenser, which discharges through a unifunction transmitter and to which voltage can be applied by a control signal switch and through a charging resistor, when a limiting value is reached. An impulse is thus sent only after the condenser is charged. The equipment is therefore not affected by bounce of the contacts of the control signal switch. Additionally, time integration results, since when the control signal switch remains for some time in one of its end-positions, several impulses are sent to the counter.

When only one impulse transmitter is used, the two contacts of the control signal switch for the upper and lower limiting values can be connected at one side to the common impulse transmitter, while at the other side each of them can be connected to one of the two control leads.

In a further form of the invention there is provided an interruptor which cuts off voltage from the control signal switch. This interruptor enables the step switch to be left at the last value to which it was set, irrespective of the control signal.

Use can also be made of a manually operable switching means which reproduces the two limiting value positions of the control signal switch, and in this way any required position of the step switch can be held. Expediently, there is associated with the switching means a charging resistor for the condenser which is other than that associated with the control signal switch and is preferably smaller, so that the sequence of impulses can occur at another and preferably greater rate than that occurring in dependence upon the control signal switch.

Furthermore, it is of advantage if a discharge gap is connected in parallel with the condenser, which discharge gap becomes effective when the control signal limiting value disappears. This discharge gap can for example lead over the corrector-emitter gap of a transistor, the base of which is at a fixed potential and the emitter potential of which is held below the base potential when the limiting value disappears. This ensures that whenever the control signal switch reaches an end-position the condenser must be charged from the zero value, and a predetermined period elapses before the first impulse is sent.

Furthermore, there can be connected on the output side of the counter a decoding means, known per se, in dependence upon the numerical content of which the power stages are switched in. In particular, the numerical figure can be equal to the number of partial capacities switched in.

In this connection it is particularly advantageous for the partial capacities to be arranged in $n$ groups of $2^{(n-1)}$ each and for a binary counter to be used in which the output signals of the $n$ counter stages each switch the associated $n^{th}$ group. This results not only in the counter output being clearly associated with the partial capacities, but in addition uniform starting up of all the sets for each partial capacity is ensured. Thus, there is no danger that, for example, the first refrigerant condenser of a refrigerating installation works at all the operating positions, whereas the eighth condenser is only brought into operation at the heaviest load. Furthermore, when this grouping arrangement is used, a special decoding means is not required.

If the counter output signals are voltages, they can directly control a capacity switch, in particular an electronic capacity switch. An electronic capacity switch that may be considered for example is a controlled rectifier, obtainable under the trade name TRIAC.

Also, there can be connected on the output side of the counter and AND element to which is fed, in addition to the pulses, the outputs of two further AND elements which have $n$ inputs associated with each counter stage, and a further input which, in the case of one AND element, receives a signal during counting up, and in the case of the other AND element receives a signal during counting down. The AND element connected on the input side of the counter then acts as a blocking means, which only lets the impulses through if all the other conditions dependent on the two other AND elements are also fulfilled. This is no longer the case if the counter is in one of its end-positions.

The count-up AND element is expediently connected to one of the sets of outputs of the counter stages, and the count-down AND element to the other outputs of the counter stages, both however carrying out an inversion. This results in very simple circuit junctions.

The invention will now be described in more detail by reference to embodiments illustrated in the drawing, in which.

Figure 1:
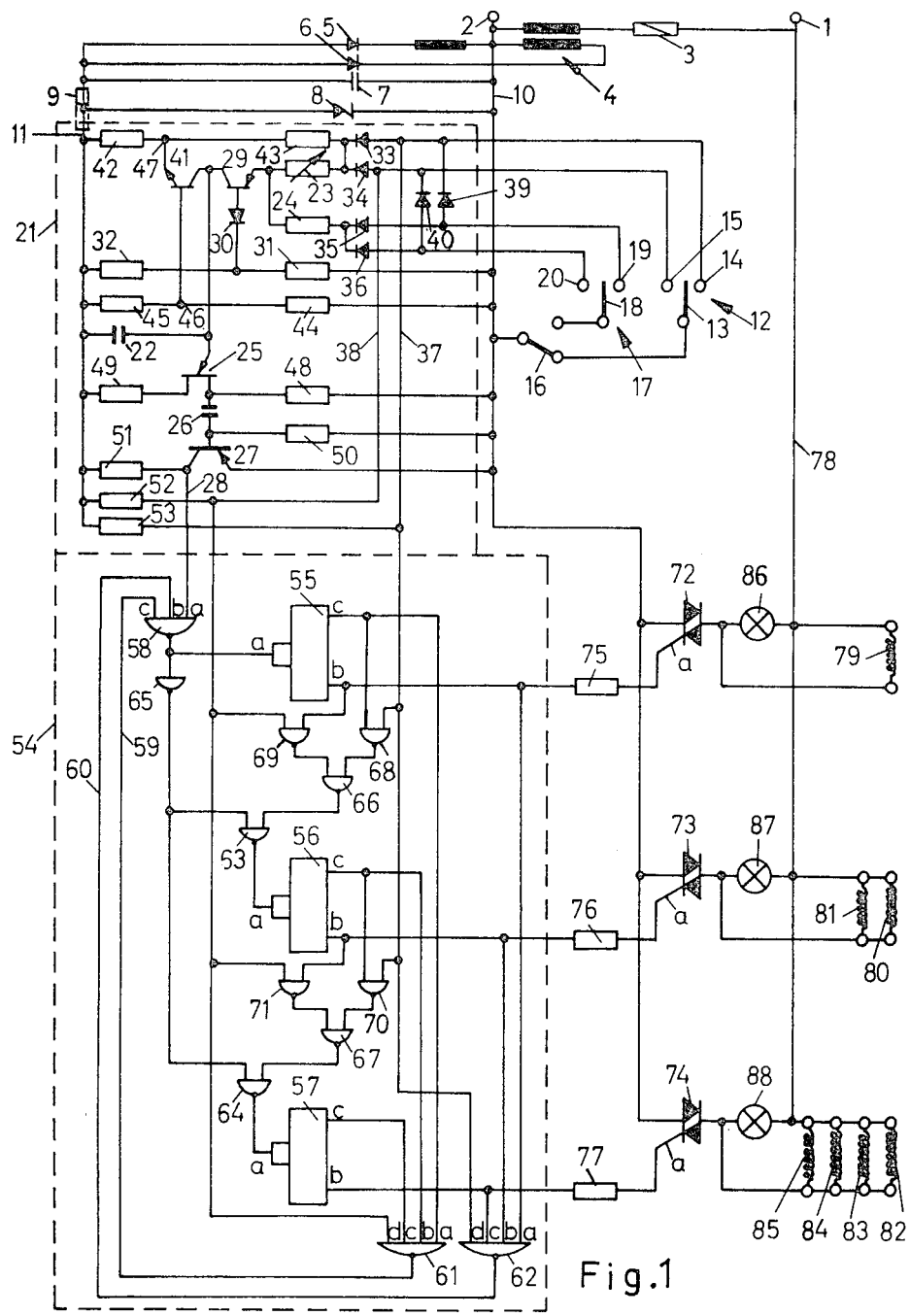
FIG. 1 shows the circuitry on one embodiment.

Connected to the terminals 1 and 2 of an alternating current system, by way of a fuse 3, is a transformer 4, on the secondary side of which a direct-current voltage is available with the help of two rectifiers 5 and 6, a smoothing condenser 7, a voltage-stabilizing Zener diode 8 and a series resistor 9 between a positive lead 10 and a negative lead 11.

A control signal switch 12, which is controlled for example by the evaporator temperature of a refrigerating installation, has a moving contact 13 and a fixed contact 14, which corresponds to the upper limiting value, and a fixed contact 15, which corresponds to the lower limiting value. The moving contact is connected to the lead 10 by way of a manually operable changeover switch 16. Furthermore, there is provided a second switch 17 which can be actuated by hand. This too has a moving contact 18 and two fixed contacts 19 and 20. By reversing the switch 16, voltage is applied to it, whereas the control signal switch 12 is cut off. By manually displacing the moving contacts 18 the upper limit can be reproduced with the help of the fixed contact 19, and the lower limit with the help of the fixed contact 20, whichever limit is required.

An impulse transmitter 21 is actuated with the help of the switches 12 and 17. This transmitter has a condenser 22, which, upon actuation of the switch 12 is charged through an adjustable charging resistor 23, and upon actuation of the switch 17, is charged through a charging resistor 24, until a voltage threshold value is reached at which a unijunction transistor 25 ignites. The condenser 22 discharges, and behind the condenser 26, an impulse can be picked up which is amplified with the help of a transistor 28 and passes out of the impulse transmitter and along a lead 28 as a positive impulse. The charging current for the condenser 22 flows through a transistor 29, which is held at a predetermined base potential with the help of a diode 30 and two voltage-distributing resistors 31 and 32. Further diodes 33, 34 and 35, 36 respectively provide for only the thermostatic switch 12 with the charging resistor 23, or the manual switch 17 with the charging resistor 24 being effective.

Also provided are two control leads 37 and 38 for the upward and downward counting respectively; these leads are connected with the contacts 14 and 15 respectively, and, through diodes 39, 40 with the contacts 19 and 20 respectively, positive voltage being applied to one of these leads when the switches 13 and 14 are in the limiting position.

Connected in parallel with the condenser 22 is a series arrangement consisting of the collector-emitter gap of the transistor 41 and a resistor 42, which at the same time, together with the resistor 43, constitutes a voltage divider. The base of the transistor 41 also lies between two resistors 44 and 45 constituting a voltage divider. The conditions are such that for example a voltage of 2 v. normally obtains between the resistors 44 and 45 (if the lead 11 is regarded as a zero reference point), whereas no voltage is present in the illustrated position of the switches at the point 47 between the resistors 42 and 43, whilst a voltage of 5 v. is present there when one of the fixed contacts 14, 15, 19 or 20 receives voltage. Consequently, the condenser 22 can always discharge through the resistor 41 when no limiting value conditions exist. However, the transistor 41 blocks as soon as the condenser 22 is to be charged as a result of the occurrence of a limiting value condition.

The impulse transmitter also has further resistors 48–53, the function of which does not however need to be explained in detail.

The switching system also incorporates a reversible counter 54, which has, as inputs, the impulse lead 28, the upward control lead 37 and the downward control lead 38. The counter 54 has three binary stages 55, 56 and 57, each of which consists of a bistable multivibrator having an input point $a$ and two output points $b$ and $c$, which alternately discharge a positive and negative voltage when a negative impulse occurs at the input point $a$. The impulse lead 28 is connected to an input point $a$ of a NAND-element 58 (AND-NOT element). Two further input points $b$ and $c$ are connected to the outputs of two NAND-element 61 and 62 through leads 59 and 60 respectively. Three input points $a$, $b$ and $c$ of the element 61 are connected to the output points $c$ of the counter stages, and the corresponding three input points of the element 62 are connected with the output points $b$ of the counter stages. Each fourth input point $d$ is fed by the upwards control lead 37 or the downwards control lead 38. The input $55a$ is directly connected to the output of NAND-element 58. The inputs $56a$ and $57a$ on the other hand are positioned at the output points of NAND-elements 63 and 64 respectively, which are on the one hand influenced by the NAND-element 58 through input impulses passed by way of a NOT-element 65 and on the other hand by the condition of the preceding counter stage by way of an OR-element 66 and 67 respectively having negatizing inputs. For this purpose, two NAND-elements 68 and 69 are connected on the input side of the OR-element 66. The input points of the element 68 are positioned at the output point $55c$ and on the control lead 37, and the input points of the element 69 are positioned at the outward point $55b$ and on the control lead 38. Similarly, two NAND-elements 70 and 71 are connected on the input side of the OR-element 67. The input points of the element 70 are positioned at the output point $56c$ and on the control lead 37, and the input points of the element 71 are positioned at the output point $56b$ and on the control lead 38.

The switching elements of the step switch are constituted by three controlled semiconductor valves 72, 73 and 74, the control electrodes $a$ of which are connected directly to the output points $b$ of the counter stages 55–57 by way of protective resistors 75, 76 and 77 respectively. A lead 78 is connected to the terminal 1, so that the full alternating-current voltage is present between the leads 10 and 78. When the valve 72 is conducting, a coil 79 is energized. When the valve 73 is conducting, two coils 80 and 81 are energized. When the valve 74 is conducting, four coils 82, 83, 84 and 85 are energized. The coils can be those of a magnetic valve, an electromagnetic relay or a motor. In any case, a partial capacity is controlled with the help of these coils. Indicator lamps 86, 87 and 88 are connected in parallel with the coils for monitoring purposes.

If it is assumed that a refrigerating system comprising seven refrigerant condensers is to be controlled with the help of this step switch, then when the temperature of the evaporator rises, the contact 13 applies voltage to the upper limiting value contact 14. The condenser 22 is charged through the resistor 23, and after some time a first positive impulse reaches the lead 28. At the same time positive voltage is applied to the upwards control lead 37. The counter stage 55 is switched in by the first impulse, the output $c$ becoming positive and the output $b$ negative. The negative voltage at the output point 72$a$ renders the valve 72 conducting, and the refrigerating machine associated with the coil 79 starts up. If this refrigerating capacity is not sufficient, i.e., if voltage continues to be applied to the contact 14, a further impulse is sent through the lead 28 after some time. This switches the counter stage 55 to zero, the output point $c$ becoming negative and the output point $b$ positive. Since a positive voltage is present in the lead 37 and the output $c$ was positive, a negative signal is at the same time sent at the output of the NAND-element 68, which signal after negatizing in the OR-element 66 provides one input point of the NAND-element 63 with a positive signal, whereas the other input point directly receives a positive impulse by way of the NOT-element 65. In this way the counter stage 56 is switched to 1, the output point $c$ becoming positive and the input point $b$ negative. The valve 73 becomes conducting, and the refrigerating machines associated with the coils 80 and 81 start up, whereas the coil 79 and the associated refrigerating machine are switched off again. In this way seven refrigerating machines can be switched in in succession.

These refrigerating machines are switched off again in an analogous manner when the moving contact 13 applies voltage to the contact 15 upon the lower limiting value being reached. Positive voltage is applied to the lead 38, and the NAND-element 63 lets through an impulse from the NOT element 65 each time the NAND element 63 receives a positive signal from the output point 55$b$ and thus sends a negative output signal which leaves the OR-element 66 as a positive signal. The same applies as regards the switching on and off of the counter stage 57.

The NAND-element 58 acts as a blocking means, which allows no further impulses to pass to the counter 54 if the latter has reached its end-position. Assuming that the counter has reached its upper end-position at which all the output points $c$ of the counter stages are positive and that a further count-up impulse is supplied, then a positive voltage is applied to all the input points of the NAND-element 61 — to the input points $a$, $b$ and $c$, because they are connected to the outputs $c$ of the counter stages, and to the input point $d$ because this is connected to the upward control lead 37. Consequently, a negative signal is supplied to the input point $b$ of the NAND-element 58 and this element 58 cannot let any impulses through. The NAND-element 62 becomes effective in a similar way when the lower end-position of the counter is reached and a further upward impulse is to be supplied.

A predetermined charging time can be established with the help of the charging resistor 23, for example by an impulse being sent each time after several seconds or minutes. The counter arrangement can of course be so designed that each of the effective counter outputs only changes when the counter has received several input impulses. If the switch 16 is reversed and the manual switch 17 is actuated, the impulses can follow each other more rapidly, for example, at intervals of 1 second. The equipment can then be brought to any particular power or capacity stage as required, and this is indicated by the lamps 86–88. The equipment continues to operate at this stage until, with the help of the switch 16, it is again set for automatic operation.

Figure 2:
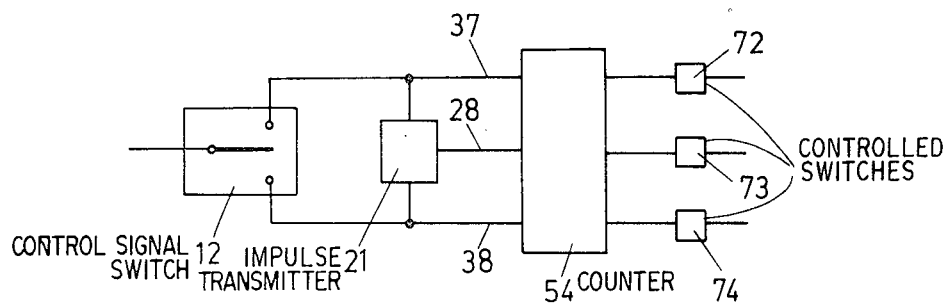
FIG. 2 shows a block connection diagram for the embodiment of FIG. 1.

FIG. 2 shows a simplified form of the circuitry seen in FIG. 1.

Figure 3:
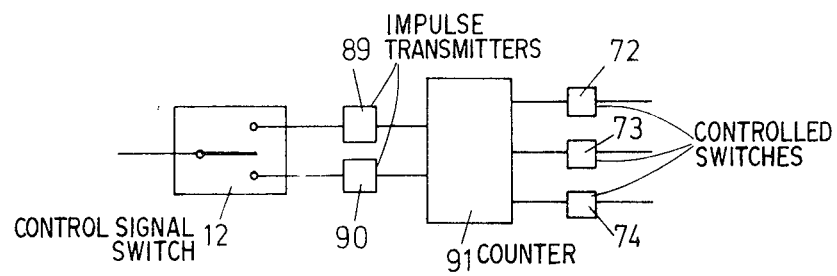
FIG. 3 shows a block connection diagram for a second embodiment.

In contrast, FIG. 3 shows an embodiment in which use is made of two impulse transmitters 89 and 90, which are associated with the upper and lower limiting values respectively of the switch 12. In this case use can be made of a counter 91 which has only one upward impulse input and one downward impulse input.

We claim:

1. A switch arrangement comprising a source of electric power, first switch means connected between said source and a first electric power consuming unit so that the supply of electric power to said first unit is controlled by the conductive condition of said first switch means, second switch means connected between said source and second and third electric power consuming units so that the supply of electric power to said second and third units is controlled simultaneously by the conductive condition of said second switch, third switch means connected between said source and fourth, fifth, sixth and seventh units is controlled simultaneously by the conductive condition of said third switch means, a binary counter comprising first, second and third two-condition binary stages connected respectively to said first, second and third switch means such that in one condition of each of said binary stages the associated one of said switch means is conducting and in the other condition of said binary stages the associated one of said switch means is not conducting, and means to supply pulses to said binary counter to control the condition of said binary stages such that any required number of said units, from 1 to 7 can be connected to said source by controlling the conditions of said binary stages.

2. A switch arrangement according to claim 1 wherein said first, second and third switch means are respective first, second and third semiconductor controlled devices each having a control electrode connected by way of a respective resistor to the respective first, second and third binary stage.

3. A switch arrangement according to claim 1 wherein said means to supply pulses to the binary counter comprises a control switch means, a unijunction transistor, and a capacitor which is charged in dependence on the condition of said control switch means until a threshold voltage value is reached at which said transistor conducts, discharging said capacitor and producing a pulse for supply to said binary counter.

4. A switch arrangement according to claim 1 wherein said means to supply pulses to the binary counter comprises a control switch means, and wherein each said binary stage has a respective AND element on the input side thereof, and a respective pair of further AND elements, the inputs of said pair of AND elements being connected to said binary stages and to said means to supply pulses to the binary counter, and the outputs of each said pair of AND elements being connected to said respective input AND element.

* * * * *